(12) United States Patent
Lamont

(10) Patent No.: US 7,147,428 B2
(45) Date of Patent: Dec. 12, 2006

(54) HYDRO TURBINE

(76) Inventor: John S. Lamont, 30th Floor-360 Main Street, Winnipeg, Manitoba (CA) R3C 4G8

( * ) Notice: Subject to any disclaimer, the term of this patent is extended or adjusted under 35 U.S.C. 154(b) by 176 days.

(21) Appl. No.: 10/996,470

(22) Filed: Nov. 26, 2004

(65) Prior Publication Data

US 2005/0123390 A1 Jun. 9, 2005

Related U.S. Application Data

(60) Provisional application No. 60/526,601, filed on Dec. 4, 2003.

(51) Int. Cl.
*F03B 3/04* (2006.01)

(52) U.S. Cl. .............. 415/1; 415/3.1; 415/4.5; 415/207; 415/211.2; 415/906; 415/908; 290/54

(58) Field of Classification Search ............... 415/2.1, 415/3.1, 4.3, 4.5, 207, 211.2, 905, 906, 1, 415/908; 290/42–43, 53–54
See application file for complete search history.

(56) References Cited

U.S. PATENT DOCUMENTS 383,291 A * 5/1888 Gustlin .................. 415/211.2
4,025,220 A   5/1977 Thompson et al.
4,258,271 A * 3/1981 Chappell et al. ............. 290/54
5,464,320 A * 11/1995 Finney ...................... 415/4.3
6,409,466 B1  6/2002 Lamont

FOREIGN PATENT DOCUMENTS

| FR | 891697 A | * | 3/1944 | ............. 415/4.5 |
| JP | 60-240878 A | * | 11/1985 | ............. 415/4.5 |
| JP | 63-150472 A | * | 6/1988 | ............. 415/3.1 |
| WO | WO 83/01656 A1 | * | 5/1983 | ............. 415/4.5 |

* cited by examiner

*Primary Examiner*—Christopher Verdier
(74) *Attorney, Agent, or Firm*—Ryan W. Dupuis; Michael R. Williams; Adrian D. Battison

(57) ABSTRACT

A water driven turbine has a divergent cone coupled to the exit end of the housing in which diameter of the cone increases with increasing distance from the exit end of the housing. A diverter formed of rigid material surrounds the free end of the cone and defines an annular space therebetween through which a flow of water passes to accelerate the flow exiting the turbine housing. The diverter is shorter in the length than the divergent cone and longitudinally overlaps the divergent cone. The diverter also has straight walls which are sloped to extend in the longitudinal direction away from the exit end of the housing at an inward incline between the leading end and the trailing end thereof.

19 Claims, 2 Drawing Sheets

HYDRO TURBINE

This application hereby claims the benefit under 35 U.S.C. Section 119(e) of U.S. provisional application 60/526,601 filed Dec. 4, 2003.

FIELD OF THE INVENTION

The present invention relates generally to an underwater turbine.

BACKGROUND OF THE INVENTION

Various designs of turbines are known for capturing useful energy from wind and water currents. These turbines typically include a housing with an opening extending therethrough for receiving the fluid flow. Rotating blades are supported within the opening to drive a generator and the like using energy converted from the fluid flow impacting the blades. Energy from the surrounding fluid flow is typically not captured and accordingly a low efficiency results due to the lost energy not harnessed.

U.S. Pat. No. 4,025,220 to Thompson discloses an underwater turbine intended to capture energy from water currents. No means are disclosed however for producing useful work from the external flow surrounding the housing. In one embodiment a funnel of fabric material is provided about the housing however the funnel appears to serve no useful purpose as the funnel diverges as it extends rearwardly beyond the exit end of the housing. Furthermore the fabric material lacks durability and does not provide an even flow about the periphery of the exit end of the housing due to its flexible nature.

SUMMARY OF THE INVENTION

According to one aspect of the present invention there is provided a water driven turbine for converting the energy of an underwater current, the turbine comprising:

an elongate tubular housing having an opening extending therethrough in a longitudinal direction from an entry end for receiving water to an exit end for releasing the water;

a shaft rotatably supported within the opening in the housing;

blade means supported on the shaft for rotation therewith to rotate the shaft when impacted with water passing through the opening in the housing;

connection means on the shaft for operatively linking the shaft to a generator such that rotation of the shaft generates electrical power;

a divergent cone coupled to the exit end of the housing having an increasing diameter with increasing distance in the longitudinal direction from the exit end of the housing upon which it is supported to a free end of the cone; and a diverter surrounding the free end of the cone and defining an annular space therebetween, the diverter being sloped to extend in the longitudinal direction away from the exit end of the housing at an inward incline.

According to a second aspect of the present invention there is provided a method of converting the energy of an underwater current, the method comprising:

providing an elongate tubular housing having an opening extending therethrough in a longitudinal direction from an entry end for receiving water to an exit end for releasing the water;

supporting a shaft rotatably within the opening in the housing;

supporting blade means on the shaft for rotation therewith to rotate the shaft when impacted with water passing through the opening in the housing;

connecting the shaft to a generator such that rotation of the shaft generates electrical power;

coupling a divergent cone to the exit end of the housing which has an increasing diameter with increasing distance in the longitudinal direction from the exit end of the housing upon which the cone is supported to a free end of the cone; and accelerating flow through the turbine by surrounding the free end of the cone with a diverter which defines an annular space between the divergent cone and the diverter wherein the diverter is sloped to extend in the longitudinal direction away from the exit end of the housing at an inward incline to direct an external flow of water into a flow exiting the housing.

The use of a diverter which slopes inwardly at the free end of the divergent cone at the exit end of the housing causes acceleration of the flow exiting the housing to reduce back pressure and increase the overall performance of the turbine unlike any known prior art devices.

The diverter is formed of rigid material forming straight walls sloping inward from a leading edge to a trailing edge thereof.

The diverter is preferably shorter in a longitudinal direction between a leading edge and a trailing edge thereof in relation to the divergent cone.

The leading edge of the diverter preferably overlaps the divergent cone in the longitudinal direction between the exit end of the housing and the free end of the divergent cone.

The diverter preferably terminates at a trailing edge spaced downstream from the divergent cone at a point where the diverter is sloping inwardly as the diverter extends in the longitudinal direction away from the exit end of the housing.

According to a further aspect of the present invention there is provided a water driven turbine for converting the energy of an underwater current, the turbine comprising:

an elongate tubular housing having an opening extending therethrough in a longitudinal direction from an entry end for receiving water to an exit end for releasing the water;

a shaft rotatably supported within the opening in the housing;

blade means supported on the shaft for rotation therewith to rotate the shaft when impacted with water passing through the opening in the housing;

connection means on the shaft for operatively linking the shaft to a generator such that rotation of the shaft generates electrical power;

a divergent cone coupled to the exit end of the housing having an increasing diameter with increasing distance in the longitudinal direction from the exit end of the housing upon which it is supported to a free end of the cone; and a diverter formed of rigid material surrounding the free end of the cone and defining an annular space therebetween;

the diverter being shorter in the longitudinal direction than the divergent cone, extending in the longitudinal direction from a leading end overlapping the divergent cone in the longitudinal direction to a trailing edge spaced downstream from the free end of the divergent cone;

the diverter having straight walls which are sloped to extend in the longitudinal direction away from the exit end of the housing at an inward incline between the leading end and the trailing edge thereof.

BRIEF DESCRIPTION OF THE DRAWINGS

One embodiment of the invention will now be described in conjunction with the accompanying drawings in which.

In the drawings like characters of reference indicate corresponding parts in the different figures.

DESCRIPTION OF THE PREFERRED EMBODIMENTS

Figure 3:
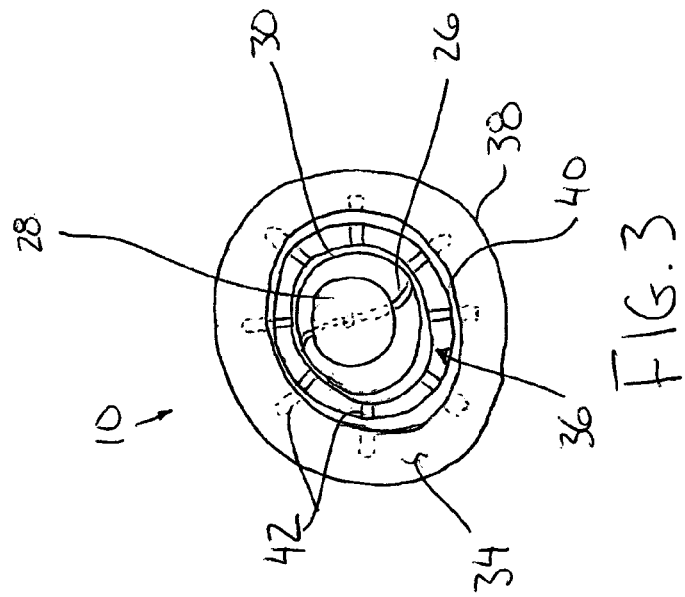
FIG. 3 is an end elevational view of the turbine.
Figure 1:
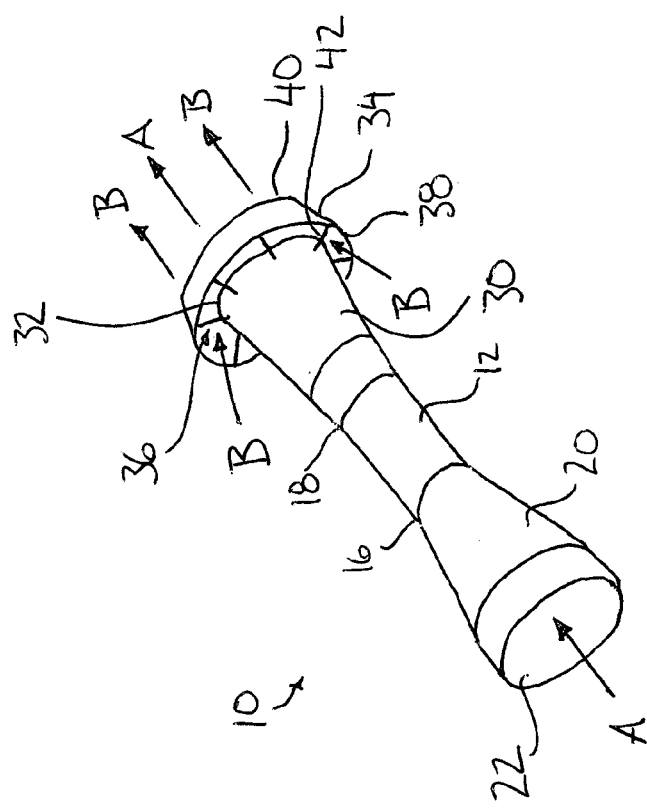
FIG. 1 is a perspective view of the turbine according to the present invention.
Figure 2:
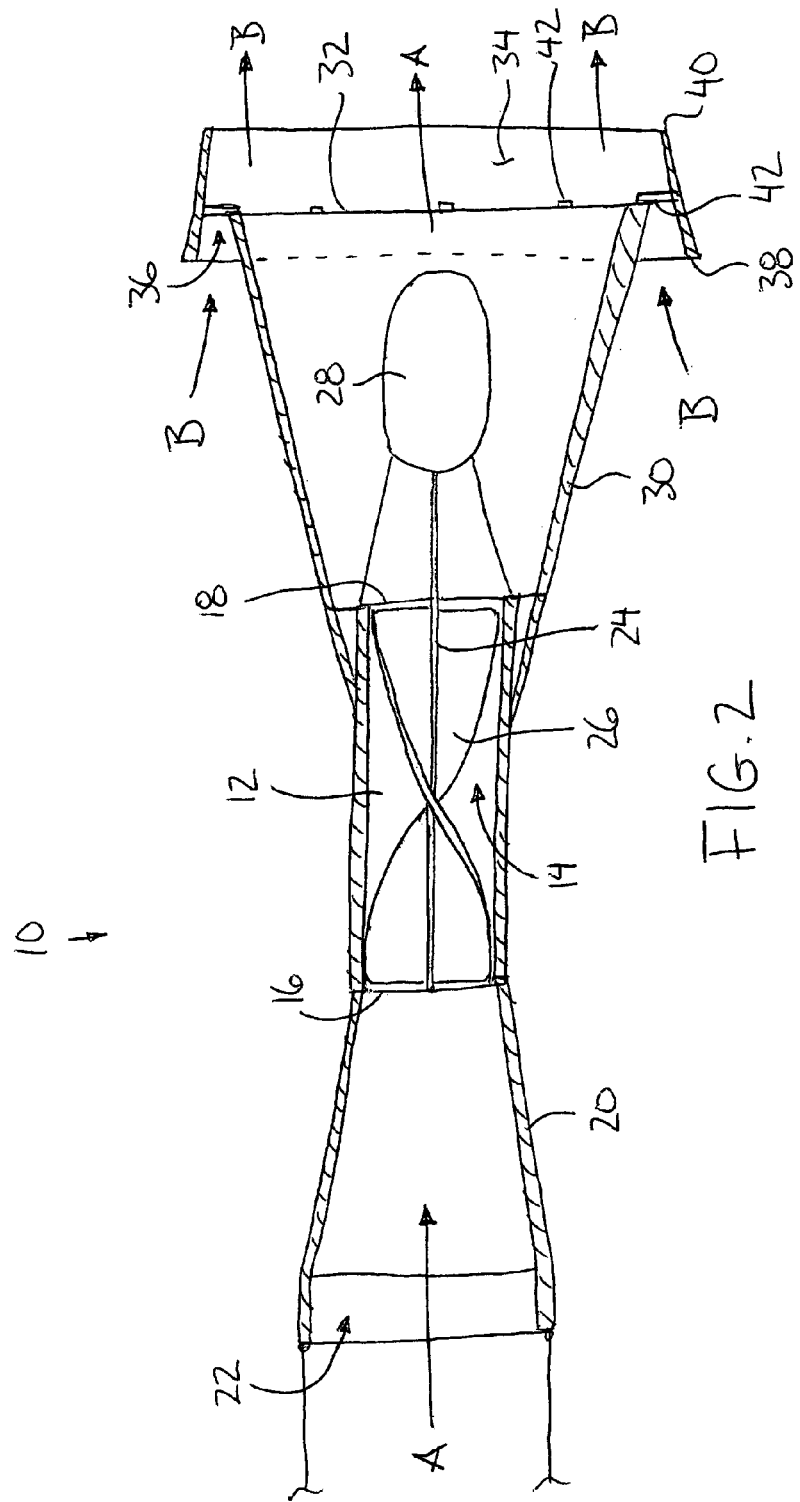
FIG. 2 is a sectional side elevational view of the turbine according to FIG. 1.

Referring to the accompanying drawings there is illustrated a turbine generally indicated by reference numeral 10. The turbine 10 is particularly useful for converting energy of a water current into useful electrical power when submerged in a river or stream.

The turbine includes a housing 12 having an elongate tubular body. The body is hollow so as to define an opening 14 extending through the housing in the longitudinal direction thereof between the entry end 16 and the exit end 18 thereof. When submerged in a river or stream, the current of water is received into the entry end and passes through the housing to be subsequently released through the exit end thereof.

A convergent cone 20 is supported on the entry end of the housing which converges from a mouth 22 at an inward incline, reducing in diameter towards the entry end 16 of the housing with which it communicates. The convergent cone collects a large volume of water to be directed into the housing.

A shaft 24 is supported within the opening in the housing to extend concentrically through the housing for rotation about a respective longitudinal axis of the shaft. Blades 26 are provided which are mounted on the shaft for rotation therewith. The blades 26 may be of various forms, but preferably comprise elongate spiralled impeller blades of the type disclosed in U.S. Pat. No. 6,409,466 to Lamont, the disclosure of which is incorporated herein by reference. The shaft 24 is coupled to a generator 28 housed in an aerodynamic casing downstream from the exit end of the housing or remotely from the housing so as to be connected to the shaft 24 by a suitable linkage 29.

A divergent cone 30 is supported at the exit end of the housing so as to diverge outwardly from the exit end in the longitudinal direction of the housing to a free end 32 of the divergent cone spaced rearwardly and downstream from the housing. Accordingly the divergent cone 30 increases in diameter with increasing distance from the exit end of the housing.

A diverter 34 surrounds the free end 32 of the divergent cone in a manner so as to define an annular space 36 surrounding the divergent cone between the cone and the diverter 34. The diverter 34 is generally frusto-conical in shape having straight smooth walls which are sloped inwardly and rearwardly in the longitudinal direction of the housing extending away from the exit end between respective leading and trailing edges 38 and 40 of the diverter.

The leading edge 38 overlaps the divergent cone 30 at a midpoint thereof in the longitudinal direction of the housing. The trailing edge 40 is spaced rearwardly and downstream from the divergent cone 30. Distance between the leading and trailing edges of the diverter 34 is shorter in the longitudinal direction than the length of the divergent cone 30 between the exit end of the housing and the free end 32 thereof.

The diverter 34 is formed of rigid material supported on the divergent cone by spokes 42 spanning between the diverter and the divergent cone at circumferentially spaced positions about the cone.

In use, a first flow indicated by reference letter A is collected by the convergent cone 20 to be concentrated and accelerated under pressure into the entry end 16 of the housing for subsequently driving rotation of the shaft 24 and the generator 28 to which it is connect by impacting the blades 26 on the shaft. The divergent cone 30 at the exit end of the housing provides an expansion at the exiting flow to reduce back pressure for increasing performance. The diverter further increases performance by collecting an external flow indicated by reference character B which surrounds the housing and which enters the annular space 36 between the diverter and the divergent cone 30.

The captured flow is accelerated by the inward sloping walls of the diverter. The accelerated flow B passing through the annular space defined by the diverter acts to accordingly accelerate the flow A with which it merges at the exit end of the divergent cone to further reduce back pressure and accordingly increase efficiency and performance of the turbine.

The cone at the rear outlet of the turbine improves the efficiency of the turbine. As described above, the diverter is a circular ring guide attached to the outer rim of the cone and designed to direct the flow of water slightly inward. The effect would be to direct a circular flow of water which the cone had accelerated around the flow of water emerging from the rear of the turbine. This has the effect of accelerating the flow out of the turbine and reducing the backward pressure against the flow as it enters the turbine and the circular vanes or blades designed to drive the generator. Accordingly, the effect would be to increase the efficiency of the hydro turbine.

Minor variations to the configuration of the diverter are possible to achieve optimum performance, depending upon the rate of flow of the stream in which the turbine is located.

As noted herein, the basic function of the diverter is to eliminate back pressure on the flow leaving the turbine at its rear exit. The diverter also has the effect of accelerating the flow around the turbine. Redirecting part of the external flow inward tends to suck out the flow exiting the turbine a little faster.

The divergent cone at the exit of the turbine already causes an acceleration of the water flowing past the cone and out from the cone in the direction of the cone's angle to the rest of the turbine. Attaching a circular ring somewhat larger than the end of the cone and slightly angled inward to the outer end of the divergent cone, in the form of the diverter described above, captures a circular flow of water to surround the water exiting from the turbine itself. The diverted flow through the diverter is faster than the flow exiting from the turbine by itself and accordingly accelerates the flow exiting from the turbine. This reduces back pressure on the exiting flow from the turbine and tends to draw it into a faster flow condition. The rings forming the diverter overlaps the end of the cone and is of an appropriate width to capture and turn a significant part of the flow.

While the preferred embodiments of the invention have been described above, it will be recognized and understood that various modifications may be made herein, and the appended claims are intended to cover all such modifications which may fall within the spirit and scope of the invention.

The invention claimed is:

1. A water driven turbine for converting the energy of an underwater current, the turbine comprising:
   an elongate tubular housing having an opening extending therethrough in a longitudinal direction from an entry end for receiving water to an exit end for releasing the water;
   a shaft rotatably supported within the opening in the housing;
   blade means supported on the shaft for rotation therewith to rotate the shaft when impacted with water passing through the opening in the housing;
   connection means on the shaft for operatively linking the shaft to a generator such that rotation of the shaft generates electrical power;
   a divergent cone coupled to the exit end of the housing having an increasing diameter with increasing distance in the longitudinal direction from the exit end of the housing upon which it is supported to a free end of the cone; and
   a diverter surrounding the free end of the cone and defining an annular space therebetween, the diverter being sloped to extend in the longitudinal direction away from the exit end of the housing at an inward incline;
   the diverter terminating at a trailing edge spaced downstream from the divergent cone at a point where the diverter is sloping inwardly as the diverter extends in the longitudinal direction away from the exit end of the housing.

2. The turbine according to claim 1 wherein the diverter is formed of rigid material.

3. The turbine according to claim 1 wherein the diverter includes straight walls sloping inward from a leading edge to the trailing edge of the diverter.

4. The turbine according to claim 1 wherein the diverter is shorter in a longitudinal direction between a leading edge and the trailing edge thereof in relation to the divergent cone.

5. The turbine according to claim 1 wherein a leading edge of the diverter overlaps the divergent cone in the longitudinal direction between the exit end of the housing and the free end of the divergent cone.

6. A water driven turbine for converting the energy of an underwater current, the turbine comprising:
   an elongate tubular housing having an opening extending therethrough in a longitudinal direction from an entry end for receiving water to an exit end for releasing the water;
   a shaft rotatably supported within the opening in the housing;
   blade means supported on the shaft for rotation therewith to rotate the shaft when impacted with water passing through the opening in the housing;
   connection means on the shaft for operatively linking the shaft to a generator such that rotation of the shaft generates electrical power;
   a divergent cone coupled to the exit end of the housing having an increasing diameter with increasing distance in the longitudinal direction from the exit end of the housing upon which it is supported to a free end of the cone; and
   a diverter formed of rigid material surrounding the free end of the cone and defining an annular space therebetween;
   the diverter being shorter in the longitudinal direction than the divergent cone, extending in the longitudinal direction from a leading edge overlapping the divergent cone in the longitudinal direction to a trailing edge spaced downstream from the free end of the divergent cone;
   the diverter having straight walls which are sloped to extend in the longitudinal direction away from the exit end of the housing at an inward incline from the leading edge to the trailing edge of the diverter.

7. The turbine according to claim 6 wherein the diverter terminates at the trailing edge spaced downstream from the divergent cone at a point where the diverter is sloping inwardly as the diverter extends in the longitudinal direction away from the exit end of the housing.

8. A method of converting the energy of an underwater current, the method comprising:
   providing an elongate tubular housing having an opening extending therethrough in a longitudinal direction from an entry end for receiving water to an exit end for releasing the water;
   supporting a shaft rotatably within the opening in the housing;
   supporting blade means on the shaft for rotation therewith to rotate the shaft when impacted with water passing through the opening in the housing;
   connecting the shaft to a generator such that rotation of the shaft generates electrical power;
   coupling a divergent cone to the exit end of the housing which has an increasing diameter with increasing distance in the longitudinal direction from the exit end of the housing upon which the cone is supported to a free end of the cone; and
   accelerating flow through the housing by surrounding the free end of the cone with a diverter which defines an annular space between the divergent cone and the diverter wherein the diverter is sloped to extend in the longitudinal direction away from the exit end of the housing at an inward incline to direct an external flow of water into a flow exiting the housing;
   the diverter including straight walls sloping inward from a leading edge to a trailing edge thereof.

9. The method according to claim 8 wherein the diverter is formed of rigid material.

10. The method according to claim 8 wherein the diverter is shorter in a longitudinal direction between the leading edge and the trailing edge thereof in relation to the divergent cone.

11. The method according to claim 8 wherein the leading edge of the diverter overlaps the divergent cone in the longitudinal direction between the exit end of the housing and the free end of the divergent cone.

12. The method according to claim 8 wherein the diverter terminates at the trailing edge spaced downstream from the divergent cone at a point where the diverter is sloping inwardly as the diverter extends in the longitudinal direction away from the exit end of the housing.

13. A water driven turbine for converting the energy of an underwater current, the turbine comprising:
   an elongate tubular housing having an opening extending therethrough in a longitudinal direction from an entry end for receiving water to an exit end for releasing the water;

a shaft rotatably supported within the opening in the housing;

blade means supported on the shaft for rotation therewith to rotate the shaft when impacted with water passing through the opening in the housing;

connection means on the shaft for operatively linking the shaft to a generator such that rotation of the shaft generates electrical power;

a divergent cone coupled to the exit end of the housing having an increasing diameter with increasing distance in the longitudinal direction from the exit end of the housing upon which it is supported to a free end of the cone; and a diverter surrounding the free end of the cone and defining an annular space therebetween, the diverter being sloped to extend in the longitudinal direction away from the exit end of the housing at an inward incline;

the diverter including straight walls sloping inward from a leading edge to a trailing edge of the diverter.

14. The turbine according to claim 13 wherein the diverter is shorter in a longitudinal direction between the leading edge and the trailing edge thereof in relation to the divergent cone.

15. The turbine according to claim 13 wherein the leading edge of the diverter overlaps the divergent cone in the longitudinal direction between the exit end of the housing and the free end of the divergent cone.

16. A method of converting the energy of an underwater current, the method comprising:

providing an elongate tubular housing having an opening extending therethrough in a longitudinal direction from an entry end for receiving water to an exit end for releasing the water;

supporting a shaft rotatably within the opening in the housing;

supporting blade means on the shaft for rotation therewith to rotate the shaft when impacted with water passing through the opening in the housing;

connecting the shaft to a generator such that rotation of the shaft generates electrical power;

coupling a divergent cone to the exit end of the housing which has an increasing diameter with increasing distance in the longitudinal direction from the exit end of the housing upon which the cone is supported to a free end of the cone; and accelerating flow through the housing by surrounding the free end of the cone with a diverter which defines an annular space between the divergent cone and the diverter wherein the diverter is sloped to extend in the longitudinal direction away from the exit end of the housing at an inward incline to direct en external flow of water into a flow exiting the housing;

the diverter terminating at a trailing edge spaced downstream from the divergent cane at a point where the diverter is sloping inwardly as the diverter extends in the longitudinal direction away from the exit end of the housing.

17. The method according to claim 16 wherein the diverter is formed of rigid material.

18. The method according to claim 16 wherein the diverter is shorter in a longitudinal direction between a leading edge and the trailing edge thereof in relation to the divergent cone.

19. The method according to claim 16 wherein a leading edge of the diverter overlaps the divergent cone in the longitudinal direction between the exit end of the housing and the free end of the divergent cone.

* * * * *